US011850897B2

(12) United States Patent
Olson (10) Patent No.: US 11,850,897 B2
(45) Date of Patent: Dec. 26, 2023

(54) TIRE CHAIN TENSIONER

(71) Applicant: Randall L. Olson, Marion, MT (US)

(72) Inventor: Randall L. Olson, Marion, MT (US)

( * ) Notice: Subject to any disclaimer, the term of this patent is extended or adjusted under 35 U.S.C. 154(b) by 755 days.

(21) Appl. No.: 17/061,878

(22) Filed: Oct. 2, 2020

(65) Prior Publication Data

US 2021/0101426 A1 Apr. 8, 2021

Related U.S. Application Data

(60) Provisional application No. 62/909,952, filed on Oct. 3, 2019.

(51) Int. Cl.
*B60C 27/10* (2006.01)

(52) U.S. Cl.
CPC .................................... *B60C 27/10* (2013.01)

(58) Field of Classification Search
CPC ............. Y10T 24/2181; Y10T 24/2119; Y10T 24/2125; Y10T 24/2149; Y10T 24/2187; B60C 27/10
See application file for complete search history.

(56) References Cited

U.S. PATENT DOCUMENTS

| | | | | |
|---|---|---|---|---|
| 1,489,067 A | * | 4/1924 | Criswell | B60C 27/10 24/69 TT |
| 1,573,759 A | * | 2/1926 | Charles | B60C 27/08 24/69 TT |
| 1,814,978 A | * | 7/1931 | Swanson | A44B 11/04 24/19 |
| 2,586,049 A | * | 2/1952 | Jacobs | B60C 27/10 152/224 |
| 4,306,602 A | * | 12/1981 | Nestlen | B60C 27/10 24/316 |
| 4,324,278 A | * | 4/1982 | Guenther | B60C 27/02 152/218 |

* cited by examiner

*Primary Examiner* — Robert Sandy
(74) *Attorney, Agent, or Firm* — AVEK IP, LLC; William B. Kircher (57) ABSTRACT

The present invention is directed to a tire chain tensioner having a central hub, a tension adjuster, and a tensioning member. There may be one or more tension adjusters attached to the central hub and there may be one or more tensioning members attached to each tension adjuster. The tension adjuster may be rotated so as to cause a corresponding tensioning member to pull a tire chain tight against a tire, thus minimizing slipping of the tire chain on the tire.

20 Claims, 7 Drawing Sheets

TIRE CHAIN TENSIONER

CROSS REFERENCE TO RELATED APPLICATION

This application claims the benefit of application Ser. No. 62/909,952, filed on Oct. 3, 2019, titled TIRE CHAIN TENSIONER.

FIELD

The present invention is generally directed to a device for use in providing sustained tension to tire chains.

BACKGROUND

When vehicles equipped with rubber, wheeled tires must operate in snowy, icy, or muddy environments, inherent problems in traversing these conditions are present. These types of tires can be problematic in snowy and icy conditions, where the tires are unable to gain traction. In these types of scenarios, the tires may spin in place, rendering the vehicle motionless. This is especially problematic for working vehicles, such as front loaders, skidders, and gradalls, causing expensive and time-consuming delays. While treaded vehicles have been developed to navigate such extreme conditions, there are many types of work vehicles that are designed with rubber tires only. Not to mention consumer vehicles such as vans and sedans that are only available with rubber tires.

A common solution to this problem comes from the use of tire chains. This method utilizes a system of chains wrapped around the individual rubber tires of the vehicle. Two chains are placed on opposite sides of the tire, attached by multiple chains crossing across the tire. With this method, the tire chains can dig into the snow, mud, or ground providing extra traction for the tires, similar to how tread vehicles operate. However, the tire chain solution is prone to issues. Over time, the chains will loosen compromising the integrity and effectiveness of the tire chains. In response, multiple devices have been developed to provide tension to these chains, keeping them tight against the tire. Two such devices are outlined below.

The first device utilizes a rubber bungee device to provide constant tension to the chains, keeping the chains pressed tight against the wheel. This method utilizes the elasticity of the rubber to provide a constant tension to the chains, preventing the chains from becoming loose. However, this method has some significant problems. First, the rubber bungee device is attached to the tire chain through hooks located at the end of the rubber bungees. The hooks can become detached from the tire chains if rubbed against debris causing the entire device to detach from the tire chains. Second, the rubber bungee device is prone to breaking. During strenuous use the rubber bungees may snap comprising the entire device. And finally, over time the rubber bungees will lose their elasticity and effectiveness.

The second device utilizes a spring-based method of providing tension to the tire chains. This method utilizes the elasticity of metal springs to provide tension to the chains, preventing the chains from becoming loose. However, similar to the rubber bungee device, this method of tire chain tension also possesses problems. Similar to the rubber bungee device, the metal springs loosen over time, causing the tire chains to lose tension. Second, this device lacks a central point of strength. The springs connect to a central ring, but the springs will constantly be pulling against one another. During strenuous use, this lack of a strong center may compromise the system causing a breakdown.

SUMMARY

Embodiments of the invention are defined by the claims below, not this summary. A high-level overview of various aspects of the invention is provided here to introduce a selection of concepts that are further described in the Detailed Description section below. This summary is not intended to identify key features or essential features of the claimed subject matter, nor is it intended to be used in isolation to determine the scope of the claimed subject matter.

The present invention is directed to a process and device used to provide tension to a tire chain when the chain is installed on a tire. In one embodiment of the invention, the device comprises a solid central hub or base with adjustable members branching out from the central hub and connecting to the tire chain, providing constant tension to keep the chain tight on the tire.

The invention may include a central hub which may take the form of a generally triangular plate. There may be tension adjusters connected to each vertex or corner of the triangular central hub using a connector. The tension adjusters may also comprise channels that receive at least a portion of their associated connector. The channel may have a first end and second end. Each tension adjuster may have an engaged position and a disengaged position. Each tension adjuster may be connected to a tensioning member; the tensioning member may take any number of forms including a length of chain. The tensioning member could have a first end that connects to a tire chain and a second end connected to the tension adjuster. The tensioning member may be connected to the tire chain using a fastening device such as a clevis.

The tensioning member may be placed in a state of tension by moving the tension adjuster to an engaged position and the tensioning member may be relieved of tension by moving the tension adjuster to a disengaged position. When the tensioning member is in a state of tension, it can hold the tire chain on the tire by pulling on the tire chain. The invention may include an adjustment tool configured to be inserted into an opening or aperture formed in the tension adjuster. The tool can be moved or manipulated (e.g., rotated) to place the tension adjuster in either an engaged or disengaged position. The connector can move along the channel as the tension adjuster is moved or rotated, to allow the tension adjuster to be placed in either an engaged or disengaged position. The second end of the tensioning member may be closer to the tension adjuster in the engaged position than when it is the disengaged position. The channel may include a notch at its second end and the tension adjuster can be rotated until the connecting member is seated in the notch, at which point the tensioning member may be in a state of tension. Also, the second end of the channel may be closer the central hub when the connecting member is seated in the notch.

DETAILED DESCRIPTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures. It will be appreciated that any dimensions included in the drawing figures are simply provided as examples and dimensions other than those provided therein are also within the scope of the invention.

The following detailed description of the invention references specific embodiments in which the invention can be practiced. The embodiments are intended to describe aspects of the invention in sufficient detail to enable those skilled in the art to practice the invention. Other embodiments can be utilized, and changes can be made without departing from the scope of the present invention. The present invention is defined by the appended claims and the description is, therefore, not to be taken in a limiting sense and shall not limit the scope of equivalents to which such claims are entitled.

Figure 1:
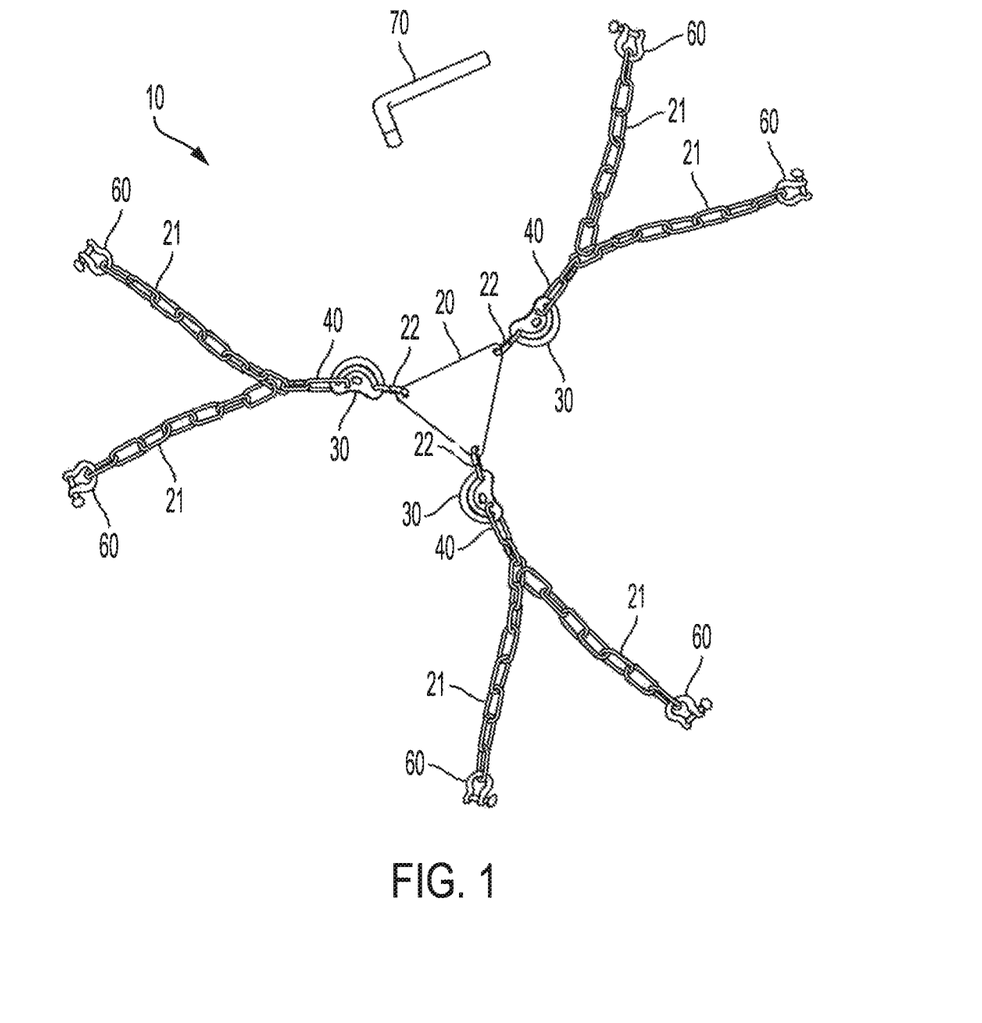
FIG. 1 is a top view of a tire chain tensioner in accordance with one embodiment of the present invention.
Figure 2:
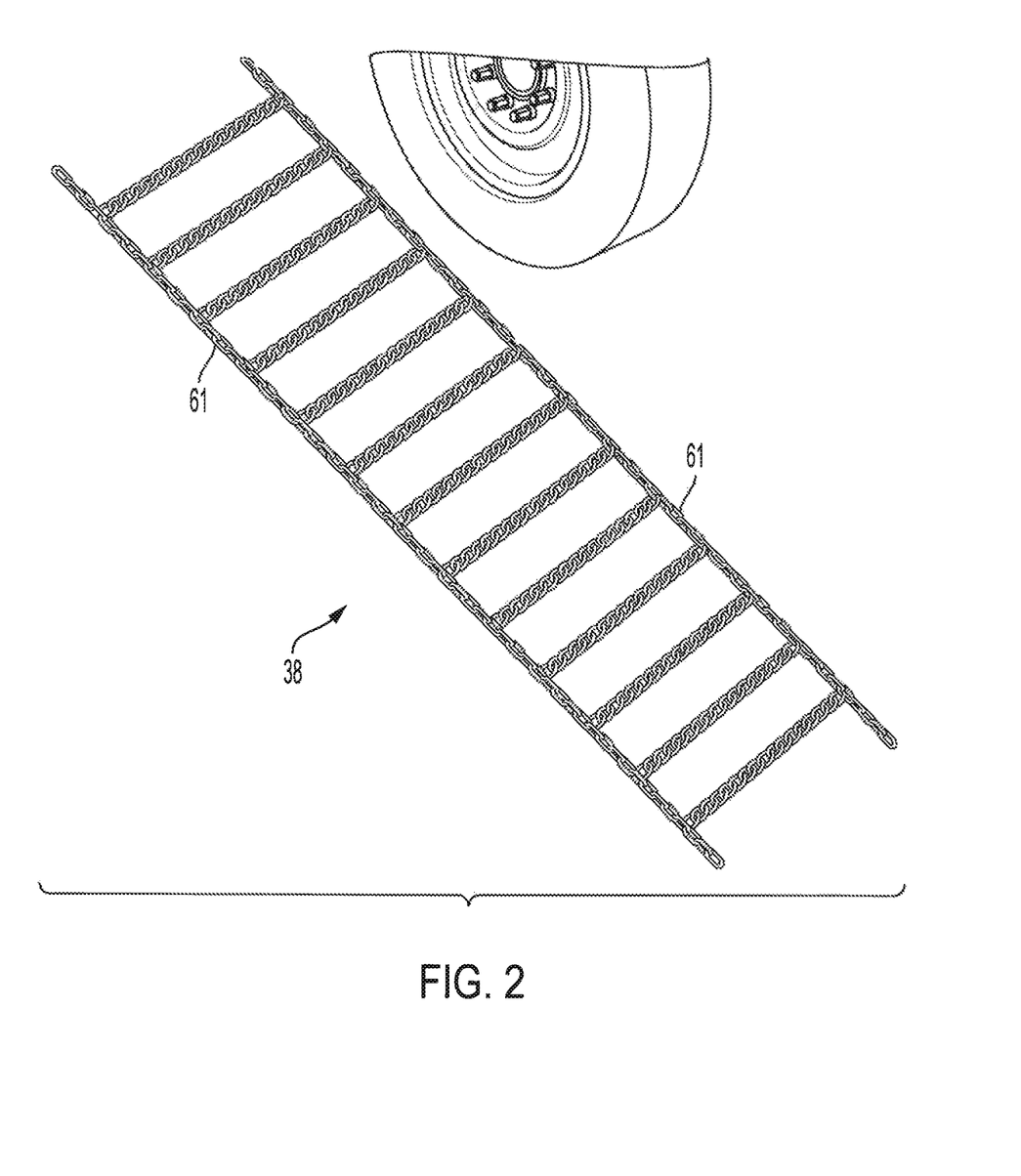
FIG. 2 is a perspective view of a tire chain assembly laying next to a tire.
Figure 3:
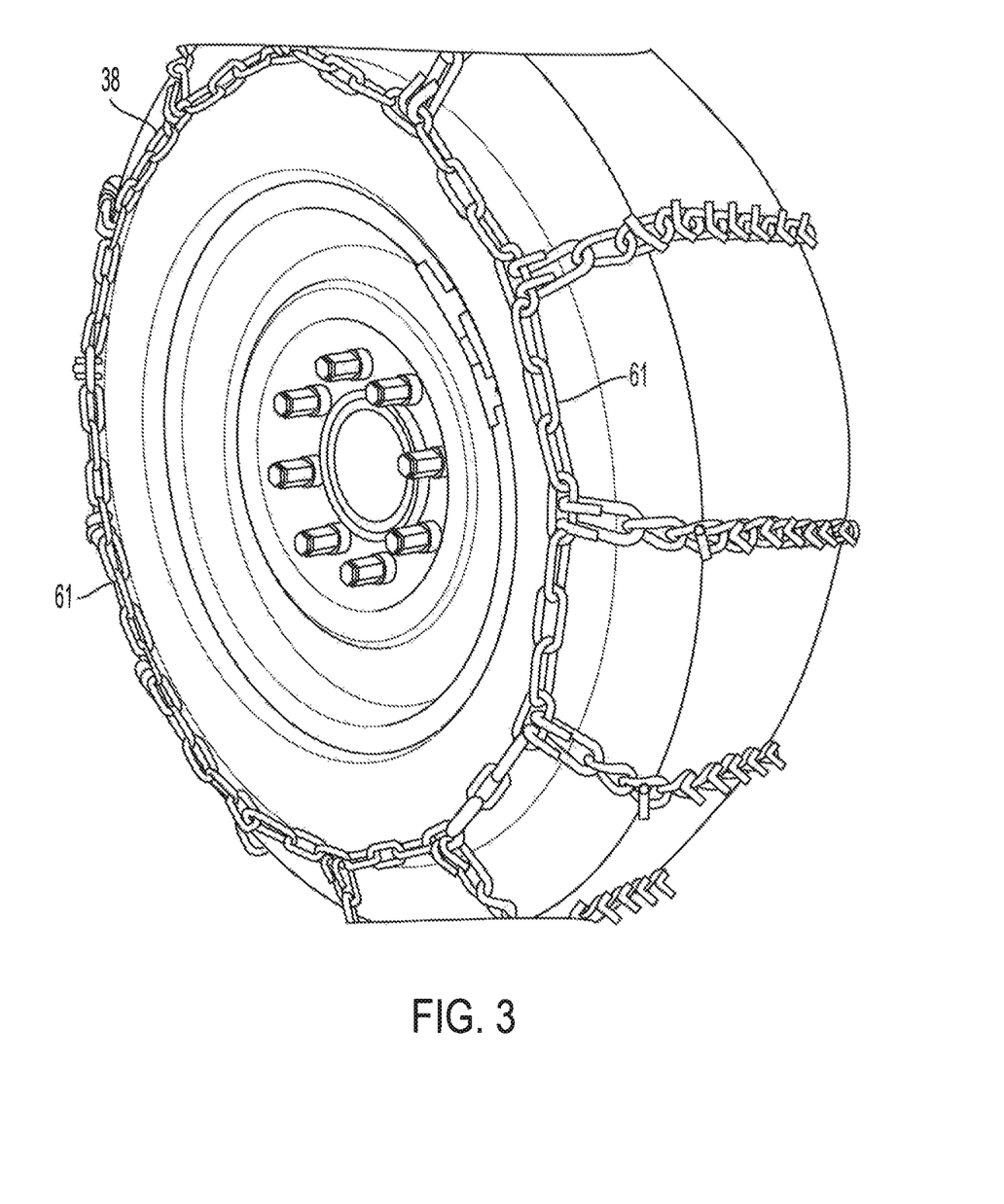
FIG. 3 is a perspective view of the tire chain assembly in FIG. 2 installed on a tire.

As shown in FIG. 1, the present invention includes a tire chain tensioner 10 that may have a central hub or base 20, one or more tensioning members 21, and one or more tension adjusters 30. Central base 20 may be in the shape of a triangular plate, however, it will be appreciated that the central base 20 may be designed in a variety of shapes including, but not limited to, circles, squares, pentagons, and other shapes. Central base 20 may be relatively thin like a plate or it may be thicker and more block-like. Central base 20 serves as a hub for tire chain tensioner 10 and it is foreseen that a variety of shapes and structures might be used for this purpose. It will also be appreciated that the central base 20 may also be made from a variety of different materials including, but not limited to steel, iron, aluminum, synthetic compounds, or other materials. In the current embodiment of the tire chain tensioner 10, the central base 20 may be made from steel. It will be further appreciated that the size of the central base 20 may vary based on the embodiment and intended use of the device. The central base may be five inches from the point of the triangle to the opposite side. It will be appreciated that the central base 20 may be larger or smaller than 5 inches, and may be 3 inches, 4 inches, 6 inches, 7 inches, or other lengths, depending on the embodiment.

Figure 5A:
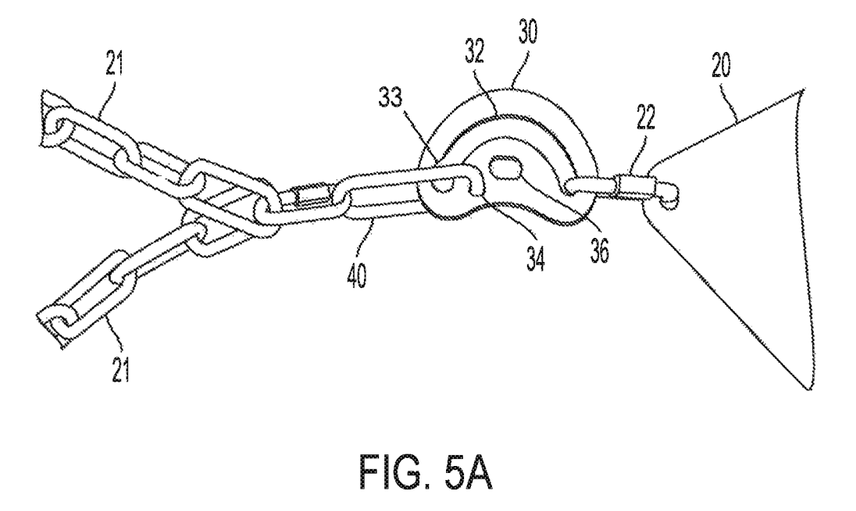
FIG. 5A is a top view of a tension adjuster for the tire chain tensioner in FIG. 1 in an untensioned state.
Figure 5B:
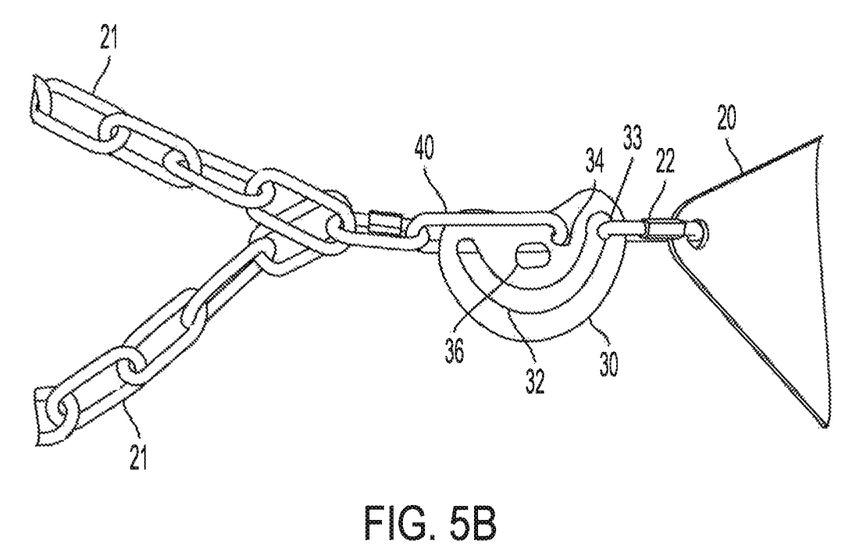
FIG. 5B is a top view of a tension adjuster for the tire chain tensioner in FIG. 1 in a tensioned state.

As best seen in FIGS. 5A and 5B, at each corner or vertex of the triangular central base 20 there may be an attachment point for at least one connecting member or connector 22 to connect and secure a tension adjuster 30 to base 20. The connector 22 may be a welded metal link, but it will be appreciated that the type of connector 22 may vary based on the embodiment and may include, but not limited to a pin anchor shackle, a carabiner, or other coupling fastener.

As further illustrated in FIGS. 5A and 5B, tension adjuster 30 may comprise an adjustment channel 32 formed therein. The adjustment channel 32 may vary in length based on the embodiment and the shape of the adjustment channel 32 may vary based on the embodiment. In one embodiment of the tire chain tensioner 10, the adjustment channel 32 is sized to accept a portion of connector 22 such that the portion is placed inside adjustment channel 32 and another portion of connector 22 is engaged with base 20, such that the tension adjuster 30 is connected to the central base 20. Adjustment channel 32 may include an enlarged section or notch 33 at one end of the channel, in which connector 22 may be located when tire chain tensioner 10 is in a tensioned state. The connector 22 may resist moving out of the notch 33 due to a lip formed by the edge of the notch 33 which separates the notch 33 from the remainder of the channel 32. When tension adjuster 30 and connector 22 are under tension, connector 22 tends to remain in the notch 33 due to the difficulty in connector 22 moving over the lip and out of the notch 33 when connector 22 is under tension and being pulled away from the lip. This may ultimately help connector 22 stay in notch 33, which ultimately helps keep tension adjuster 30 in an engaged position.

The tension adjuster 30 may further comprise at least one tensioning member opening 34. The tensioning member opening 34 may be located on the tension adjuster 30 so that when the connector 22 is positioned at one end of the adjustment channel 32 proximate a first end of the tension adjuster 30, the tensioning member opening 34 will be located proximate a second opposite end of the tension adjuster 30. One such position of the tensioning member opening 34 is illustrated in FIG. 5A.

The tension adjuster 30 may further comprise at least one adjustment tool opening 36. The adjustment tool opening 36 may vary in size based on the embodiment. The adjustment tool opening 36 is large enough to accept an adjustment tool 70. The shape of the adjustment tool opening 36 may vary based on the embodiment, and as illustrated in FIGS. 5A and 5B, the adjustment tool opening 36 may be oval shaped. Other shapes and designs of the adjustment tool opening 36 may include, but is not limited to, circular, triangular, and rectangular.

As shown in FIG. 1, the tire chain tensioner 10 may also comprise an adjustment tool 70, for adjusting the tension applied to the device 10. The adjustment tool 70 may be designed in a variety of different designs and materials, depending on the embodiment of the present invention 10. It will be appreciated that the adjustment tool 70 may be designed as an L-shaped wrench. The adjustment tool 70 may further comprise a compatible port so that the adjustment tool 70 may be inserted into the adjustment tool opening 36. The shape of the port may vary based on the embodiment of the invention, and in the current embodiment the shape of the port is oval shaped, matching the shape of the adjustment tool opening 36.

Figure 4A:
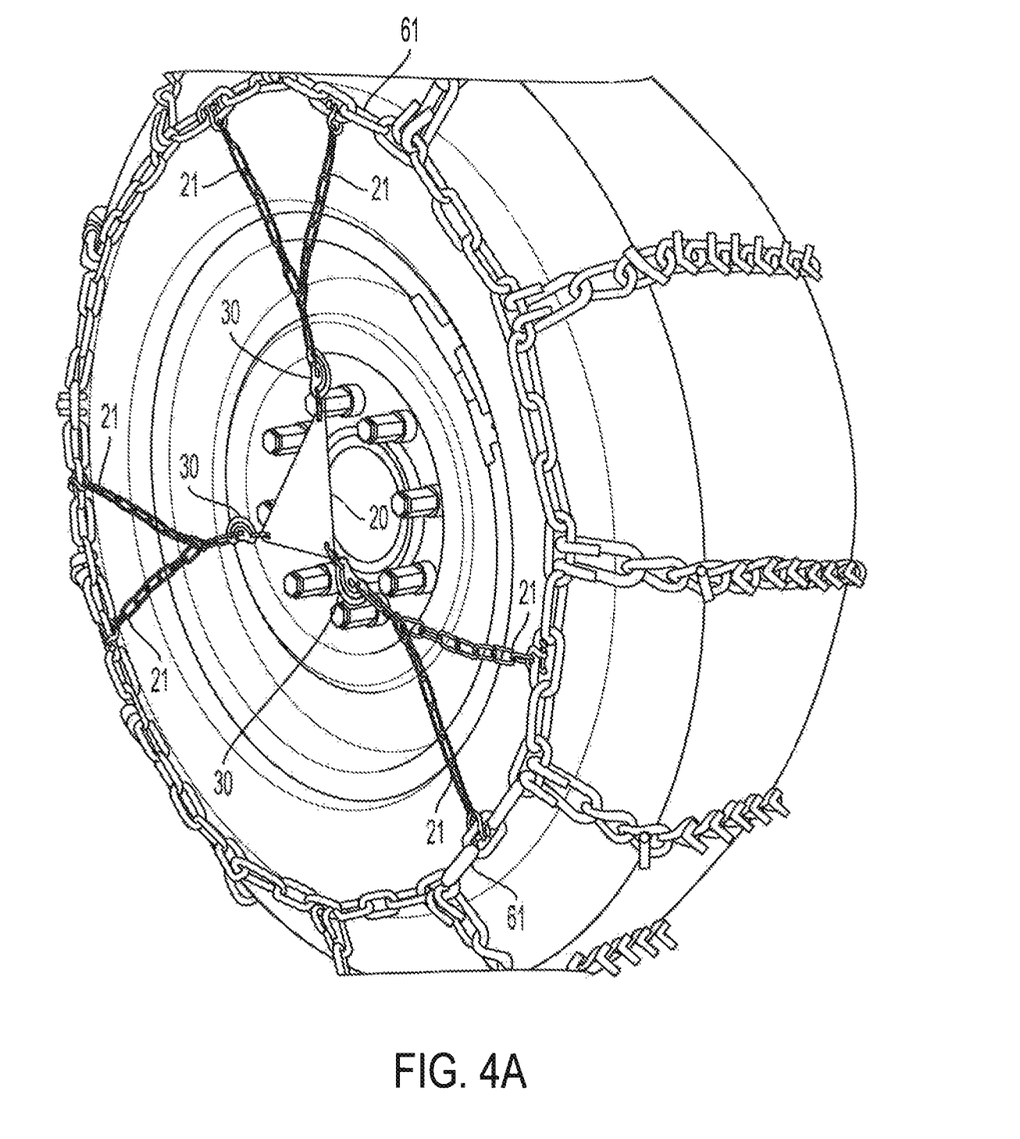
FIG. 4A is a perspective view of the tire chain tensioner in FIG. 1 secured to a tire chain assembly installed on a tire, with the tire chain tensioner in an untensioned state.
Figure 4B:
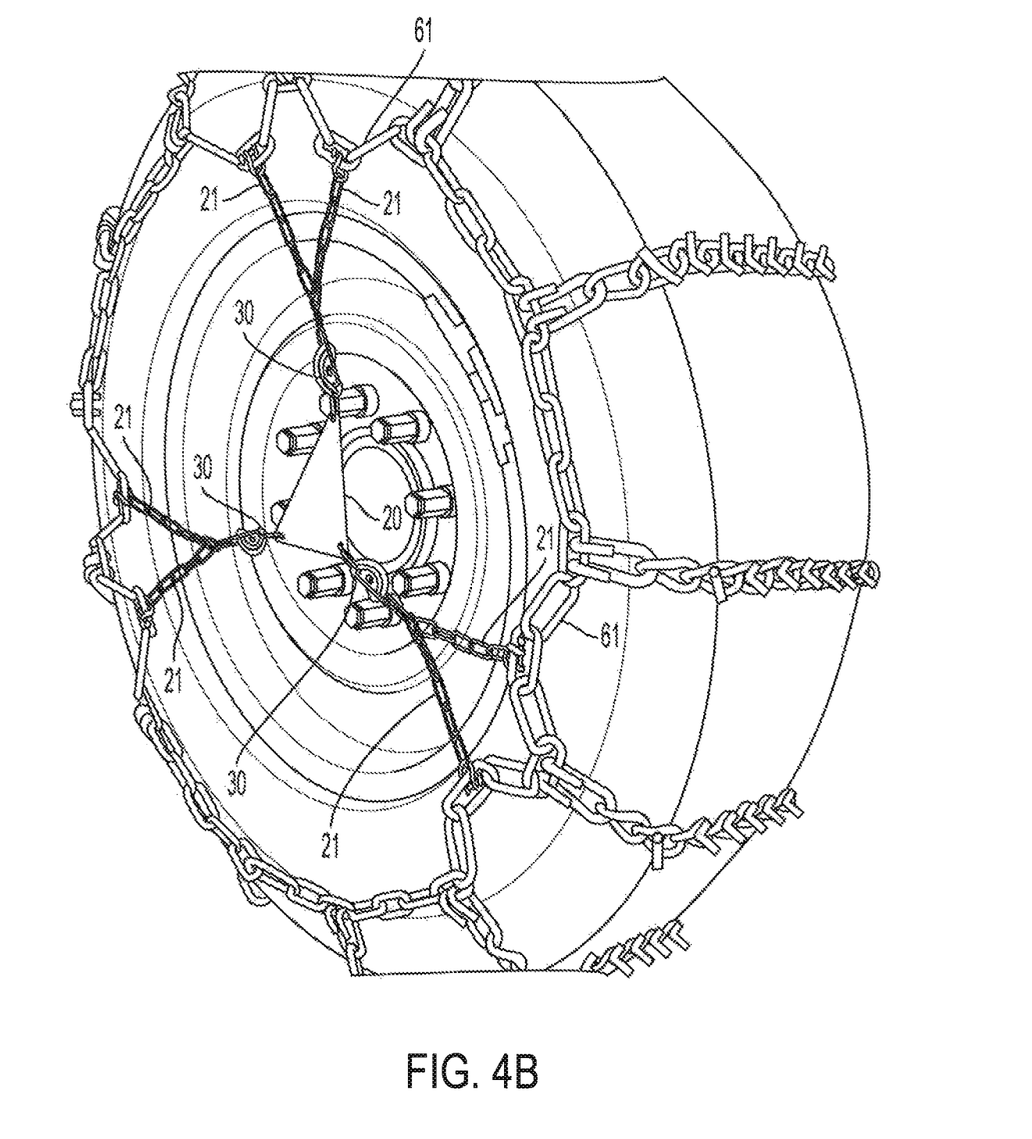
FIG. 4B is a perspective view of the tire chain tensioner in FIG. 1 secured to a tire chain assembly installed on a tire, with the tire chain tensioner in a tensioned state.

As shown in FIG. 4A, there may be at least one tensioning member 21 connecting the tire chain tensioner 10 to the tire chains 38. The tensioning member 21 may consist of, without limitation, chains, ropes, and cords. As shown in the figures, the tensioning member 21 in the current embodiment comprises a chain. The tensioning member 21 may be connected to the tension adjuster 30 using a tensioning member fastener 40. Tensioning member fastener 40 may be designed as a variety of fastening devices including, but not limited to a clamp, carabiner, or clevis. In one embodiment, the tensioning member fastener 40 may be a welded link. One tensioning member fastener 40 may also connect to multiple tensioning members 21. For example, tensioning member fastener 40 may connect to two tensioning members 21 of equal length such that when tire chain tensioner 10 is engaged, each of the two tensioning members 21 will exert a similar amount of force on tire chain 38. Another example is a single tensioning member 21 folded in half and connected to the tensioning member fastener 40 at the midway point of the tensioning member, which would effectively create two legs of equal length. Each of the legs of the tensioning member 21 could serve as two separate tensioning members 21.

The length of the tensioning member 21 may vary depending on the size of the tire the device will be applied to. It will be appreciated that in an embodiment that comprises a rectangular central base, the device may include four tensioning members 21 connected to the device at each corner of the rectangular base. In another embodiment comprising a pentagonal central base, the invention may include five tensioning members 21 connected to each vertex or corner of the pentagonal central base.

Figure 6:
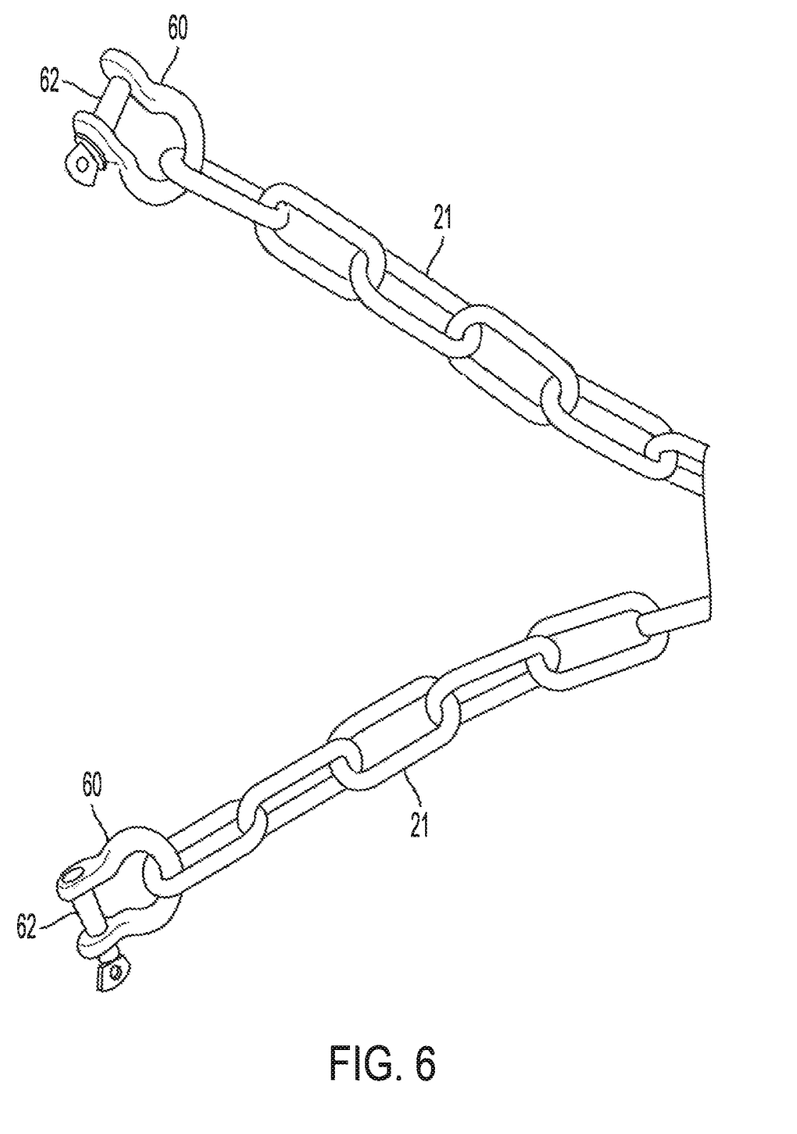
FIG. 6 is a top view of a pair of tensioning members having fastening devices for attaching the tire chain tensioner in FIG. 1 to a tire chain assembly.

As best seen in FIG. 6, at each end of each tensioning member 21, a fastening device 60 may be affixed. The fastening device may be a clevis of other affixing device. The fastening device 60 may be affixed to tire chain 38 by locking a clevis in place on a circumferential member 61 of the tire chain 38 using a clevis pin 62. Each fastening device 60 may be attached to the tire chain 38 at points providing the most support.

Once the clevis 60 of all tensioning members 21 are affixed to the tire chain(s), the tire chain tensioner 10 may be tightened. The tire chain tensioner 10 may utilize a cam lock system or other methods of applying tension to the tire chain 38. To tighten tire chain tensioner 10 such that it applies tension to tire chain 38, a user first inserts the adjustment tool 70 into the adjustment tool opening 36. The user may then apply a rotational force to the adjustment tool 70, which in turn rotates the tension adjuster 30 with respect to the central base 20. More specifically, the tension adjuster 30 may rotate as connector 22 moves through the adjustment channel 32. As the connector 22 remains static, the rotational force applied to the tension adjuster 30 may draw the first end of the tension adjuster 30 and the tensioning member fastener 40 towards the central base. It will be appreciated that this will in turn draw the tensioning members 21 closer to the central base 20 as well. Thus, by drawing the tensioning members 21 closer to the central base 20, tension and force will be applied to the connected circumferential member 61 of the tire chain 38, tightening the circumferential member 61 to the tire or wheel. Rotational force may be applied to a single or plurality of the tension adjusters 30. For example, if an embodiment uses three tension adjusters 30, one of them may be left unrotated and disengaged while the other two are rotated and engaged. Tension may be relieved from the device by inserting the adjustment tool 70 into a tension adjuster 30. The operator may then apply directional force away from the central base 20, which may in turn loosen the tension caused by the tension adjuster 30.

From the foregoing, it will be seen that the present invention provides several new and useful improvements over known tire chain tensioners. By comprising a strong, stable, and sound central support system, the present invention provides a stronger and more reliable tire chain tension device. In the current embodiment utilizing a triangle design for the central base 20, force is applied uniformly, preventing surges of force that can cause damage to the tire chain tensioners 30. The solid design of the tension adjusters 30 prevents stretching loss of tension. The present invention 10 may be used multiple times without a reduction of effectiveness. The fastening method of the present invention 10 provides a stable connection to tire chains without a risk of falling off during use. The present invention also provides customization options, in which the operator may add or remove chain links to increase or decrease length of the device, depending on the application of the device.

From the foregoing, it will be seen that this invention is one well adapted to attain all the ends and objects hereinabove set forth together with other advantages which are inherent to the structure and method. It will be understood that certain features and sub combinations are of utility and may be employed without reference to other features and subcombinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including," and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

It is to be understood that while certain now preferred forms of this invention have been illustrated and described, the present invention is not to be limited to the specific forms or arrangement of parts described and shown, and that the various features described may be combined in other ways than those specifically described without departing from the scope of the present invention.

Having thus described the invention, what is claimed as new and desired to be secured by Letters Patent is:

1. A device used to provide tension to a tire chain installed on a tire, the device comprising:
   a central hub;
   a tension adjuster connected to said central hub, said tension adjuster having an engaged position and a disengaged position; and
   a tensioning member connected to said tension adjuster, said tensioning member having a first end and a second end, said first end for connecting to a tire chain and said second end connected to said tension adjuster, wherein said tensioning member is in a state of tension when said tension adjuster is in said engaged position and not in a state of tension when said tension adjuster is in said disengaged position.

2. The device of claim 1, wherein said second end of said tensioning member is positioned closer to said central hub when said tension adjuster is in said engaged position than when said tension adjuster is in said disengaged position.

3. The device of claim 2, wherein the central hub is a generally triangular plate.

4. The device of claim 3, further comprising one of said tension adjusters connected to each vertex of said triangular central hub.

5. The device of claim 4, wherein each tension adjuster is secured to the central hub with a connector.

6. The device of claim 5, wherein each tension adjuster further comprises a channel that receives at least a portion of said connector.

7. The device of claim 6, further comprising an adjustment tool configured to be inserted into said tension adjuster and manipulated to put said tension adjuster in either said engaged or said disengaged position.

8. The device of claim 7, wherein said portion of said connector moves along said channel when said adjustment tool is manipulated to put said tension adjuster in either said engaged or said disengaged position.

9. The device of claim 8, wherein said tensioning member connects to a tire chain using a fastening device.

10. The device of claim 9, wherein said tensioning member comprises a metal chain.

11. The device of claim 10, wherein said fastening device is a clevis.

12. A device used to provide tension to a tire chain installed on a tire, the device comprising:
 a central hub;
 a tension adjuster secured to a connecting member that is secured to said central hub;
 a channel formed in said tension adjuster and adapted to receive at least a portion of said connecting member, said channel having a notch at an end, said connecting member movable along said channel when said tension adjuster is rotated until said connecting member is seated in said notch, wherein said tensioning member is in a state of tension when said connecting member is seated in said notch; and
 a tensioning member connected to said tension adjuster, said tensioning member adapted to hold the tire chain on a tire by pulling on the tire chain when said tensioning member is in a state of tension.

13. The device of claim 12, wherein said second end of said tensioning member moves closer to said central hub as said connecting member moves along said channel toward said notch.

14. The device of claim 12, wherein said central hub is a generally triangular plate.

15. The device of claim 14, further comprising one of said tension adjusters connected to each vertex of the triangular central hub.

16. A device used to provide tension to a tire chain installed on a tire, the device comprising:
 a central hub;
 a tension adjuster secured to a connecting member that is secured to said central hub;
 a channel formed in said tension adjuster and adapted to receive at least a portion of said connecting member, said channel having a first end and a second end with a notch at a said second end, said connecting member movable along said channel when said tension adjuster is rotated;
 a tensioning member connected to said tension adjuster, said tensioning member adapted to hold the tire chain on a tire by pulling on the tire chain when said tensioning member is in a state of tension, said tensioning member having a fastening device for securing said tensioning member to the tire chain; and
 an adjustment tool configured to be inserted into an aperture in said tension adjuster and rotate said tension adjuster until said connecting member is seated in said notch in said channel, wherein said tensioning member is in a state of tension when said connecting member is seated in said notch in said channel.

17. The device of claim 16, wherein said tensioning member comprises a metal chain.

18. The device of claim 17, wherein the central hub is a generally triangular plate.

19. The device of claim 18, comprising one of said tension adjusters connected to each vertex of the triangular central hub.

20. The device of claim 19, wherein at least one of said tension adjusters has multiple said tensioning members connected to it.

* * * * *